Sept. 6, 1932. W. M. TAYLOR 1,875,778
ROAD GRADING MACHINE OR OTHER VEHICLE
Filed Aug. 15, 1929 4 Sheets-Sheet 1
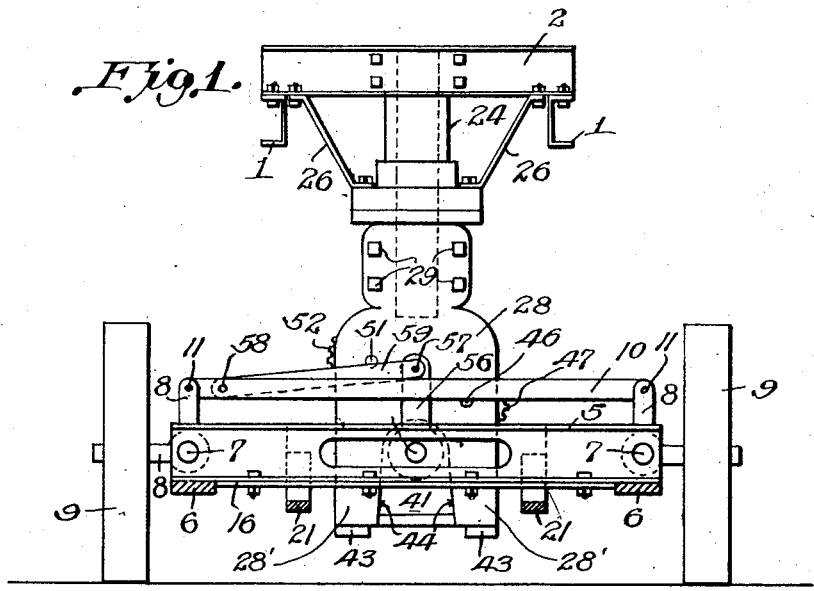
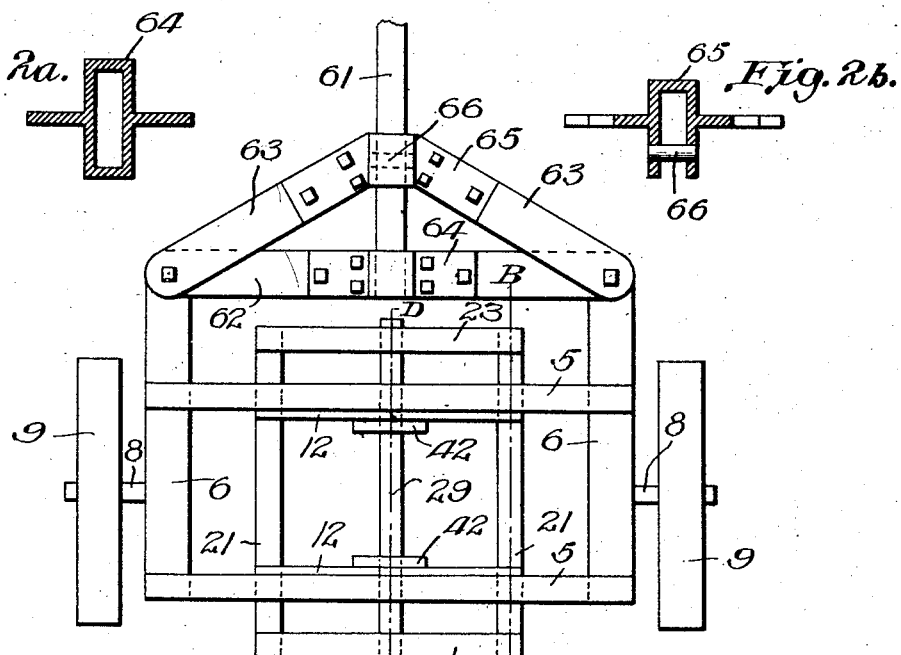
Inventor.
William M. Taylor
By Minturn & Minturn
Attorneys.

Sept. 6, 1932.  W. M. TAYLOR  1,875,778
ROAD GRADING MACHINE OR OTHER VEHICLE
Filed Aug. 15, 1929  4 Sheets-Sheet 2
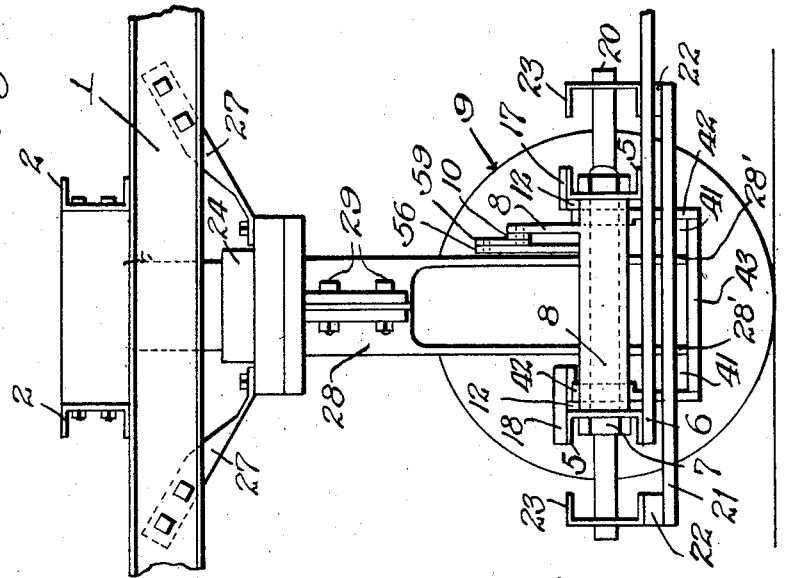
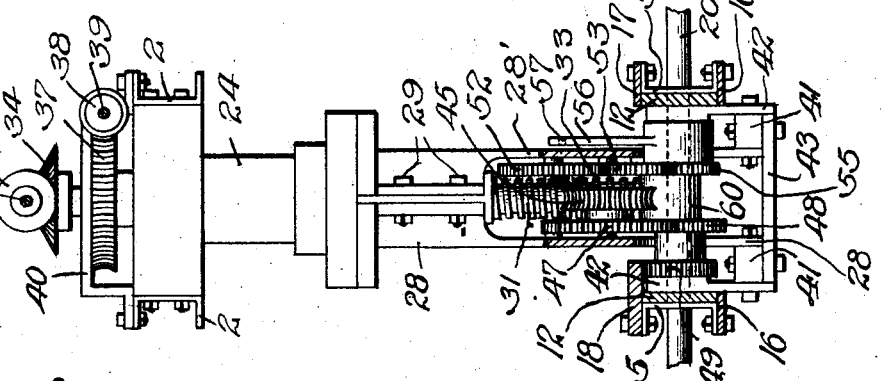
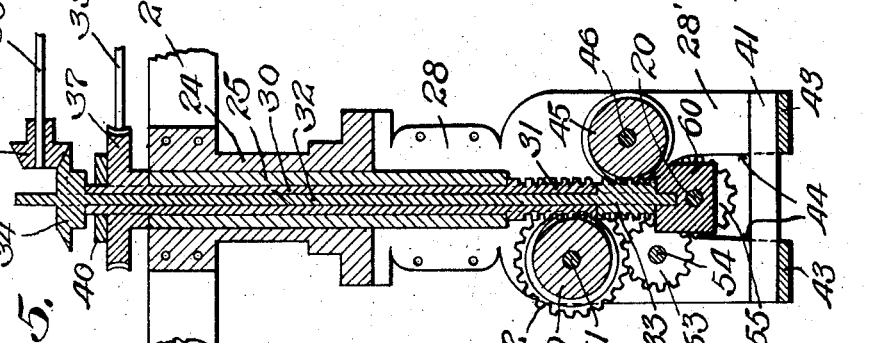
Inventor
William M. Taylor
By Minturn & Minturn
Attorneys Sept. 6, 1932.  W. M. TAYLOR  1,875,778
ROAD GRADING MACHINE OR OTHER VEHICLE
Filed Aug. 15, 1929  4 Sheets-Sheet 3
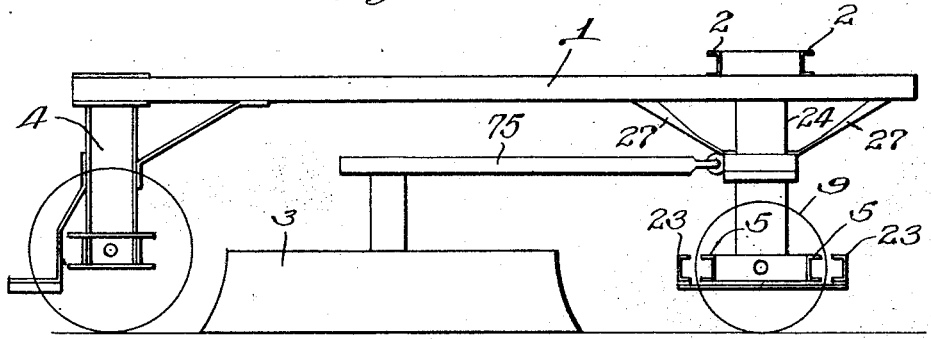
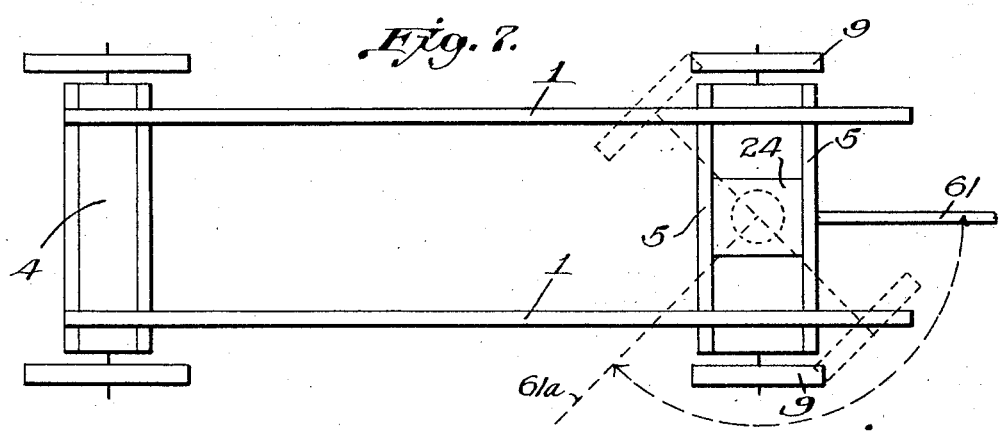
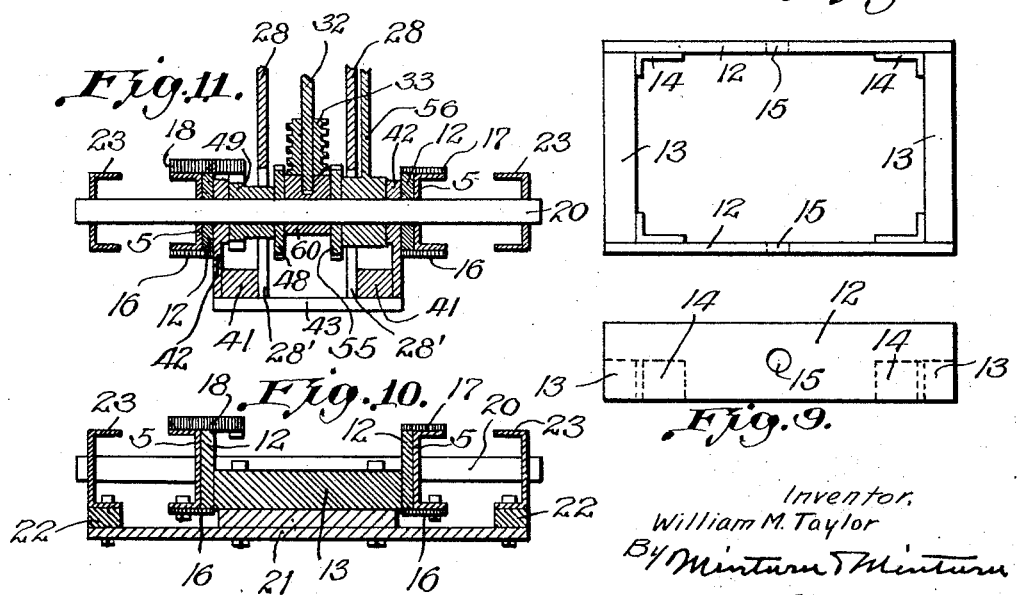
Inventor,
William M. Taylor
By Minturn & Minturn
Attorneys.

Sept. 6, 1932.   W. M. TAYLOR   1,875,778
ROAD GRADING MACHINE OR OTHER VEHICLE
Filed Aug. 15, 1929   4 Sheets-Sheet 4

Inventor.
William M. Taylor
By Minturn & Minturn
Attorneys.

Patented Sept. 6, 1932

1,875,778

UNITED STATES PATENT OFFICE

WILLIAM M. TAYLOR, OF INDIANAPOLIS, INDIANA

ROAD GRADING MACHINE OR OTHER VEHICLE

Application filed August 15, 1929. Serial No. 386,002.

This invention relates to road making machines comprising a body frame, four wheels upon which the frame is mounted and a scraper blade between the two pairs of front and rear wheels.

When these wheels are in operation the axles are usually inclined at an angle to the horizontal and, when they are so inclined, it is desirable to maintain the body frame approximately horizontal at all times, regardless of the inclination of the axle. It is also desirable that the wheels, both front and rear, be capable of being leaned to the side, in order that the face of the tire may press against the wall of earth, and thus give a rolling brace against the side thrust of the load on the downhill side. Further, it is desirable that the point at which the body frame is attached to the axle be capable of being moved longitudinally of the axle, in order that the weight of the machine shall be transferred to the wheels so as to give the proper relative downward pressure on the wheels, for the conditions experienced.

A road making machine capable of fulfilling these requirements is covered by my Patent 1,686,941. In that patent the leveling of the machine body is controlled by the rear axle. The tilting of the wheels and the side shifting of the load is controlled on both the front and back axle, each by a separate control. In that patent the steering is done by steering knuckles on the front axle moved horizontally, like an automobile, and the tilting of the wheels is accomplished by a device which permits the moving of these same knuckles vertically as well. The front axle, as set forth in the patent referred to is stationary in a horizontal direction but has a motion vertically so that the wheels may conform to the contour of the ground.

The invention for which this application is made is for a front axle to be used in place of the one just described. This invention is applicable for the front axle in the patent just referred to or for the front axle of any machine or vehicle wherein the axle inclines to the horizontal and where the bed or machine body must be maintained approximately level.

In the operation of a road making machine it is frequently necessary to turn the machine around in a comparatively narrow space and, on this account, the automobile type of front axle is not always suitable. For this reason it is desirable to have a front axle which will turn around a king pin and in which the front wheels will turn completely under the machine, in order that the road machine can be turned on a road which in width is only slightly in excess of the overall length of the road making machine.

The first object of this invention, therefore, is to provide a means, in combination with others which will be named presently, for making a front axle to be used in connection with a road grader, or other machine or vehicle requiring an approximately transverse level bed regardless of the inclination of the axles, by which the front axle can be rotated completely around a vertical pivot for making a turn of the machine or vehicle in the least possible width of road, and by the use of which the ordinary steering of the machine is accomplished as it was and is in the old fashioned wagon.

A second object is to provide a means to be used in connection with a machine or vehicle having an approximately transversely level bed, for giving a vertical movement to the axle around a horizontal pivot, so that the wheels at the ends of the front axle may follow the uneven ground over which these wheels travel and at the same time still maintain the cross level of the body frame of the machine or vehicle.

A third object is to provide a means to be used in connection with a machine or vehicle having an approximately transversely level bed, by which the wheels can be leaned or tilted to the side in order that the face of the tire may press against the wall of earth, and thereby give a rolling brace against the side thrust of the load, and at the same time still maintain the cross level of the body frame of the machine or vehicle.

A fourth object is to provide a means to be used in connection with a machine or vehicle having an approximately transversely level bed, by which the body frame may be shifted sidewise so that the longitudinal center line of the machine or vehicle may be moved nearer to one wheel or the other as desired, in order that the downward pressure on the wheels exerted by the weight of the body frame may be greater or less on one wheel or the other, as the conditions of operation demand, and at the same time still maintain the cross level of the body frame of the machine or vehicle.

A fifth object is to provide a means to be used in connection with a machine or vehicle having an approximately transversely level bed, by which the horizontal pivot bar, about which the axle moves as set forth in the second object and which carries the mechanism for accomplishing what is set forth in the third and fourth objects, shall be of some length and held firmly at its ends to prevent rocking and twisting when the machine or vehicle is steered or turned around as set forth in the first object.

While all five of these objects may and can be operated in combination, each without interference with the other, nevertheless any one may be operated singly and separately if the conditions of the work to be done require such single operation, or any two or more may be used if the conditions of operation require it.

Other objects will appear in the course of the following description.

The objects set forth have been stated as applying to road graders but it does not necessarily follow that this front axle to be described applies to road graders alone. The axle can be used for any service wherein the bed of the machine or vehicle body must be carried approximately transversely level regardless of the inclination or angularity of the axle and where the other requirements are, to a greater or less extent, similar to what road graders require.

Further, this front axle can be used on any grading machine or vehicle wherein the body frame is maintained approximately level and therefore does not specifically apply in connection with the applicant's Patent 1,686,941. In the description of the front axle which follows it is assumed that the body frame of the machine is maintained level by means not described. In the case of my own patent just referred to above this description is fully set forth but such a description has no place herein as the objects set forth are to accomplish certain results on a machine or vehicle wherein the body frame is assumed to be approximately level.

I now describe my invention, so that others skilled in the art to which it belongs may make and use the same, reference being made to the accompanying drawings in which similar numbers of reference refer to similar parts throughout, it being understood that changes can be made within the scope of what is claimed without departing from the spirit of the invention.

In the drawings, Fig. 1 is a front elevation of this front axle.

Fig. 2, is the plan showing the attachment of the tongue to the axle and the long pivot shaft set forth in the fifth object.

Fig. 2a, is a section of a link attached to the machine into which the rear end of this tongue is fitted. Fig. 2b, is a section of the pivot connection for attaching this tongue.

Fig. 3, is the side elevation of the axle with parts removed.

Fig. 4, is the side elevation of the king pin and the gear assembly above and below the king pin.

Fig. 5, is the section of the king pin and the gear assembly above and below the king pin.

Fig. 6, is the side elevation of the road grader showing the attachment of the draw bar which operates the scraper blade.

Fig. 7, is the plan of the road grader showing the field of rotation of the front axle.

Fig. 8, is the plan and Fig. 9 the elevation of the sliding box in the axle.

Fig. 10, is a section through the line A B of Fig. 2.

Fig. 11, is a section through the line C D of Fig. 2, with sections of the operating gearing added.

Figure 12:
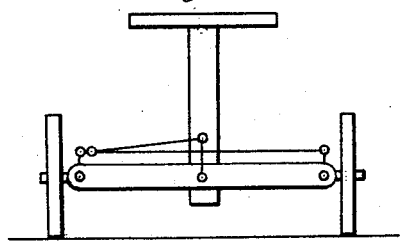
Fig. 12, shows an outline of the apparatus in normal position with the axle horizontal, the wheels vertical and the point of support of the body frame midway between the wheels.

The reach beams 1 of the body frame are connected together by cross channel beams at both ends, those in the front numbered 2 being placed on top of the reach beams 1. Those at the rear, not numbered, are between the reach beams 1 and are secured by plates and braces also not numbered.

The controls for the scraper blade 3 by which it is raised and lowered, moved sidewise or rotated, are attached to the beams 1 and are thence extended back to the operator's platform at the rear. They are not shown as they are not a part of this invention. Proper controls within the rear axle assembly 4, not shown, maintain the reach beams 1 approximately level in a transverse direction of the machine, which means that the cross beams 2 to which the front axle is directly attached will always be approximately level in the direction of their length.

The front axle consists of the double channel bars 5 placed with their flanges to the outside and their plain sides to the center. These channels 5 are held in proper relation to each other by the tie plates 6 riveted to the under sides of the channels 5 at their ends. Additional tie plates may be used in practice or those illustrated may be considerably enlarged without interfering with the spirit of the invention.

Near the end of each of the channels 5 is a bearing pin 7 extending through both channels, which bearing pin 7 supports the angle arms 8 carrying the wheels 9, all as shown in Fig. 1. Each of the angle arms 8 carrying the wheels 9 has a vertical upwardly extending arm which arms are connected together by the cross arm 10 by means of which the two wheels 9 through the arms 8 are always held parallel with each other, the connection between the arms 8 and 10 being made by wrist pins 11.

Between the channel bars 5 is a sliding frame shown in Figs. 8 and 9 consisting of two pieces 12 of proper thickness and having the same width as the depth of the channels 5. These pieces 12 are connected together by cross pieces 13 and the frame is held rigid by angle pieces 14, forming a box without top or bottom, the width of this box being slightly less than the distance between the channels 5 so that this box will slide freely lengthwise between the two channels 5 when these channels are attached together by the tie plates 6. In the plates 12 are holes 15 for the insertion of a pivot shaft 20 which will be described later. The plates 12 are fastened to the pieces 13 and 14 by countersunk headed bolts so that the outside surfaces of the box will present a smooth surface.

This box is described as being built up of the pieces 12, 13 and 14. It may however be made in a single casting without departing from the spirit of my invention.

This box is held from dropping below the channels 5 by pieces 16 bolted to the channels 5 and extending the length of them and the box is held from lifting above the channels 5 by the pieces 17 and 18. Piece 17 is similar to pieces 16 but piece 18 is heavier and on the lower side of its inner edge it carries a rack the use of which will be seen presently.

Pieces 17 and 18 extend the length of the channels 5 the same as pieces 16. In both of the channels 5 a slot 19 (Fig. 1) is cut, the width of which is slightly greater than the diameter of the shaft 20, to the end that when this shaft 20 is placed in the holes 15 of plates 12 after the box has been inserted between the channels 5 as just described, this box can have a movement lengthwise of the channels 5.

In order that the strain due to the use of the axle will not be concentrated on a single pivot and may be transmitted to a point nearer the end of the axle where there is greater leverage, pieces 21 (see Figs. 2 and 10) are attached to the bottom of each of the pieces 13 of the box with a spacer between so that piece 21 will not come in contact with the bolts holding 16 to the channels 5 (see Fig. 10). At the end of 21, through the spacers 22, pieces 21 are bolted to the channels 23 which channels are properly bored at their center for a rotating fit on shaft 20. Diagonal braces, not shown, connect 23 and 21 in order to preserve them in a fixed right angle relation with each other. Piece 21 with its spacer is rigidly bolted to piece 13 of the box making the whole a rigid unit, all parts of which are held in rigid relation with each other.

The parts consisting of the side plates 12, the cross pieces 13, the angle pieces 14, the pieces 21, the spacers 22, and the channels 23, is a unit which for convenience in the further description of this invention I will designate as box Z.

The connection between the front end of the body frame and the axle is shown in section in Fig. 5 and in elevation in Figs. 1, 3 and 4. It consists of a tubular member 24 the upper end of which has a square boss on the outside with bolt holes therethrough so that this tubular member 24 may be securely bolted to the cross channels 2. The lower end of the tubular member 24 has a circular boss faced square with the axis of the tubular member 24. The circular boss serves as the upper half of the fifth wheel of the machine.

The lower boss of the tubular member 24 is braced sidewise of the machine to the channels 2 by the diagonal braces 26 and is braced lengthwise of the machine to the reach beams 1 by the diagonal braces 27.

Within the tubular member 24 slides the second tubular member 25, with a neat sliding fit so that the one may rotate about the other freely without lost motion. This tubular member 25 which is the king pin for the invention to be described presently, extends below the bottom of the tubular member 24 a sufficient distance to give ample room for securely clamping thereto the lower support 28 for the front axle, and extends upward to the top of the tubular member 24 and which is also the top of the cross channels 2. This lower support 28 in the present design is split and clamped to the tubular member 25 by the bolts 29 (Fig. 4), but this tubular member 25 and the lower supporting member 28 can be made in a single piece. The upper part of the supporting member 28 is flanged and is faced square with the axis of the tubular member 25 in order to form the lower half of the fifth wheel of the machine. The diameter of this flange on 28 is shown as being the same as the lower portion of tubular member 24 but it may have a greater or less diameter as the needs of the general design require. With the lower support 28 clamped to the tubular member 25 and the latter inserted within the tubular member 24, the two faces of the fifth wheel will come in contact and the weight of the body frame of the machine will be transferred to the lower support 28 and at the same time tubular member 25 and its attached member 28 can rotate about tubular member 24. The lower support 28 is so designed that in addition to bearing the load of the machine body it also provides a support for the bearings of the gear mechanism for the axle, which will be described presently.

Within the tubular member 25 slides a third tubular member 30. This tubular member 30 extends above the top of tubular member 25 and below the bottom of tubular member 25. At the bottom end is keyed a worm 31 so that the tubular member 30 and the worm 31 will rotate together as one. The bottom of tubular member 30 terminates at the bottom of the worm 31. Within the tubular member 30 slides a shaft 32. This shaft extends above the top of tubular member 30 and below the bottom of member 30. Near, but not at, the bottom of shaft 32 is keyed a worm 33 so that the shaft 32 and the worm 33 will rotate together as one. This shaft 32 extends beyond the bottom of the worm 33 a sufficient amount to give bearing for its support as will be described presently.

At the top of tubular member 30 is keyed the worm gear 37 so that 30 and 37 will turn together. Meshing with the worm gear 37 is a worm 38 held in relation to the worm gear 37 by bearings, not shown. Rod 39 is keyed to worm 38 so that the two will turn together and this rod 39 extends back to the control platform, back of the rear axle, so that the rod 39 may be turned from there. The extension of rod 39 to the rear platform is not shown. The turning of this rod 39 by the operator on the rear platform will in turn rotate the worm 38, the worm gear 37, the tubular member 30 and the worm 31. Members 37 and 38 need not necessarily be a worm gear and worm but may be any means that will transmit the motion of the rod 39 to the worm 31 in the manner described.

The upper end of the tubular member 30 extends above the worm gear 37 a sufficient distance to give bearing for the upper end of the tubular member 30. This bearing may be attached to the bed frame of the machine in any convenient way. For illustration it is shown as member 40 formed to enclose worm gear 37 and is bolted to the top of the channels 2.

The upper end of the shaft 32 extends above the bearing 40 a sufficient amount to attach the bevel gear 34 and for a bearing, not shown, above the bevel gear 34. This bearing, not shown, is attached to the bed frame of the machine in any convenient way. The bevel gear 34 is keyed to the shaft 32 so that 34 and 32 will turn together. Meshing with the bevel gear 34 is a bevel pinion 35 held in relation to the bevel gear 34 by bearings, not shown. Rod 36 is keyed to the bevel pinion 35 so that the two will turn together and this rod 36 extends back to the control platform, back of the rear axle, so that the rod 36 may be turned from there. The extension of rod 36 to the rear platform is not shown. The turning of this rod 36, by the operator on the rear platform, will in turn rotate the bevel pinion 35, the bevel gear 34, the shaft 32 and the worm 33. Members 34 and 35 may not necessarily be a bevel gear and bevel pinion but may be any means that will transmit the motion of the rod 36 to the worm 33 in the manner described. The general assembly of the vertical connection between the bed frame and the front axle, the details of which will be described presently, consisting of the tubular member 24, the second tubular member 25, the braces 26 and 27, the lower support 28 and its extension 28', the clamp bolts 29, the tubular member 30, the worm 31, the shaft 32, the worm 33, the bevel gear 34, the bearing 40, the tie pieces 41, the pieces 42, the tie pieces 43, the worm gear 45, the shaft 46, the spur gear 47, the spur gear 48, the spur gear 49, the worm gear 50, the shaft 51, the spur gear 52, the spur gear 53, the shaft 54, the spur gear 55, and the arm 56 will, for convenience, in the further description of this invention be designated as assembly Y.

The lower portion of the lower supports 28, which I will designate as 28' extend downward a sufficient distance to accomplish the results which presently will be set forth. These supports 28' and the assemly which they carry are not themselves directly pivoted to the shaft 20 but provide a support for such pivot as will be now shown. To the outer faces of the lower supports 28' are rigidly fastened tie pieces 41 (Fig. 11) and to the outer faces of these tie pieces 41 the pieces 42 are rigidly fastened. In practice this connection between 28' and 42 may be considerably changed and made in a single piece but the description given will illustrate the principle.

The bearing pieces 42 have bearings which provide a sliding fit upon the shaft 20 and by means of these bearings in 42 the assembly Y is carried and can have a certain amount of rotation around the shaft 20 as an axis. Further, these bearings in pieces 42 are the bearings through which the weight of the assembly Y and consequently the weight of the front end of the machine is transferred to the axle, since this shaft 20 also passes through the sides of the box Z and the box Z slides within the axle. The bearing pieces 41 are held in their proper distance apart and in fixed relation with each other by the tie plates 43. The bottom of the supporting members 28' are slotted at the bottom as indicated by 44, (Figs. 1 and 5) for the insertion of mechanism which will be described hereafter.

The worm 33 engages with a worm gear 45 (Figs. 4 and 5) which operates upon the shaft 46, this shaft 46 being supported at its ends within the supporting members 28'. To the side of worm gear 45, in proper relation with it and rotating on the same shaft 46 is spur gear 47. These two gears 45 and 47 are firmly held together so that the rotating of the worm gear 45 will also rotate the spur gear 47.

They are held in proper position with reference to the supporting member 28' and the worm 33 by means of collars, not shown, on shaft 46. Spur gear 47 engages with spur gear 48 the latter spur gear rotating freely upon shaft 20. To the side of spur gear 48 and rotating freely on the same shaft 20 is the spur gear 49 which carries a heavy boss on its side next to the spur gear 48. The thickness of the boss on the spur gear 49 is such as to bring the face of the spur gear 49 into proper relation to the rack already described, this rack being a part of member 18. The spur gear 48 and the spur gear 49 are firmly held together so that the rotating of one will also rotate the other. The outer face of the spur gear 49 is in rotating contact with the inner face of the bearing piece 42 on that side of the machine and at the same time the boss is of such thickness that the spur gear 48 registers properly with its corresponding spur gear 47. With the spur gear 49 in engagement with the rack carried by member 18 it is obvious that a rotation of the spur gear 49 would move the assembly Y lengthwise of the axle in either direction depending on the direction of rotation of the spur gear 49.

The worm 31 engages with the worm gear 50 which operates upon the shaft 51, shaft 51 being supported at its ends within the supporting member 28'. To the side of the worm gear 50 and in proper relation to it and rotating on the same shaft 51 is a spur gear 52. These two gears 50 and 52 are firmly held together so that the rotating of the worm gear 50 will also correspondingly rotate the spur gear 52. They are held in proper position with reference to the supporting members 28' and the worm 31 by means of collars, not shown, on the shaft 51.

The spur gear 52 engages with the spur gear 53 which rotates upon the shaft 54, this shaft 54 at its ends being supported within the supporting members 28'. Spur gear 53 is an idler and is held in proper relation with spur gear 52 and with spur gear 55 which will be described presently by means of collars, not shown on shaft 54.

The spur gear 53 engages with spur gear 55 the latter spur gear rotating freely on shaft 20. To the side of spur gear 55 in proper relation with it and rotating freely on the same shaft 20 is the arm 56. Arm 56 has a hub at its lower end the thickness of which is such as to bring the arm in proper relation to its nearest supporting member 28'. Further than this, the arm 56 and the spur gear 55 are held firmly together so that the rotating of the spur gear 55 will also rotate the arm 56 through the same angle. The outer face of the hub of the arm 56 is in rotating contact with the inner face of the bearing piece 42 on that side of the machine and the thickness of the hub on 56 is sufficient to have the spur gear 55 register with its corresponding spur gear 53.

At the upper end of the arm 56 is the hole for a wrist pin 57 (Fig. 1). Near the left hand end of the cross arm 10 is another hole for a wrist pin 58. A connecting arm 59, by means of wrist pins inserted through the holes 57 and 58, joins the arm 56 with the cross member 10 and any rotation of the arm 56 around the shaft 20 will give end movement to the cross arm 10 and a corresponding tilting of the wheels 9 sidewise of the machine will result.

In some cases the idler spur gear 53 might be omitted and the spur gears 52 and 55 be enlarged and mesh together. The arrangement shown is preferable for reasons which will appear later although the omission of the idler spur gear 53 in no way affects the spirit of my invention.

In order that the spur gears 48 and 55 may remain in their proper relationship a spacer block 60 is used (Figs. 5 and 11). This spacer block 60 has parallel side faces and a flat face on top at right angles to the side faces. Extending from one side face to the other it has a hole of proper size to slide over and rotate about shaft 20. In the center of the top face and with its axis at right angles to it, and also at right angles to the axis of the hole for shaft 20 just described, is a hole of such size that the end of the vertical shaft 32 may be inserted with a rotary fit that will enable shaft 32 to rotate within the block 60. The block serves the double purpose of keeping the spur gears 48 and 55 in alignment with the gears into which they mesh and also acts as a thrust bearing for the shaft 32. The spacer 60 rides freely on the shaft 20 but does not turn with it.

Fig. 11 shows the sectional assembly on shaft 20 of the essential working parts of the device and the coordination between the vertical and horizontal axes. Reference to Fig. 11 shows the two channels 5 which form the front axle and the plates 16, 17 and 18 which form the sides for the box Z. The sides 12 of box Z form a bearing for the shaft 20. The channels 5 themselves have no bearings on the shaft 20 but the sides 12 of the box Z being held to the channels 5 by the plates 16, 17 and 18 makes it possible for the box Z to rotate with the channels 5 about the shaft 20. The weight of the machine body is transmitted to the axle through the assembly Y. This is accomplished by means of bearings in the members 42 which are rotatably attached to shaft 20. The members 5 are likewise rotatably attached to shaft 20 through the medium of the box Z. It therefore follows that the wheels 9 in following the surface of the ground will incline the axle at varying angles to the horizontal without changing the vertical position of the assembly Y or affecting the cross level of the bed frame of the machine.

Referring also to Fig. 11 it has been shown that the arm 56 if rotated about the shaft 20 would produce a side motion of the cross arm 10 and this in turn would produce a tilting of the wheels 9. From the description already given it is clear that a turning of the rod 39 by the operator at the rear of the machine, by means of the intervening mechanism, will move the arm 56 one way or the other around the shaft 20 thereby giving the desired tilt to the wheels. This can be done without interfering with the tilt of the axle about a horizontal axis.

In Fig. 11 the plate 18 on top of one of the channels 5 carries a rack as already described. Into this rack meshes a spur gear 49. The slots 19 in the channels 5 (Fig. 1) permit a certain amount of motion of the shaft 20 (and the mechanism carried by shaft 20) lengthwise of the channel 5. The mechanism carried by shaft 20 consists of the box Z and the assembly Y. It is evident therefore that any rotation of the spur gear 49 will move the shaft 20, and consequently the box Z and the assembly Y, lengthwise of the axle (which are represented by the channels 5) in either direction depending on the direction of rotation of the spur gear 49. A turning of the rod 36 by the operator at the rear of the machine, by means of the intervening mechanism, will rotate the spur gear 49 one way or the other thereby moving the shaft 20 carrying the assembly Y, and consequently the front of the bed frame of the machine, lengthwise of the axle. This can be done without any interference with the tilt of the axle around a horizontal axis.

It is obvious that if the control rod 36 is operated to move the shaft 20 along the axle in one direction or the other in order to shift more of the weight of the machine to the wheel on that side then the arm 56 will also be moved toward that side without being rotated about the shaft 20 and this will tilt the top of the wheels in the direction toward which the shaft 20 is moved.

If this movement of the shaft 20 lengthwise of the axle does not give a satisfactory tilt to the wheels the control 39 which rotates the arm 56 around the shaft 20 can be operated and by this means the tilt of the wheels can be altered to a satisfactory angle for the condition of operation when the shaft 20 is in its new position.

With this invention the vertical axis, around which the front axle revolves when the front axle is moved for steering or turning the machine, always makes a right angled intersection with the horizontal axis around which the front axle revolves when the wheels raise or lower in following the irregular surface of the ground. These two axes always are in this right angled intersection with each other in every movement of the horizontal axis lengthwise of the axle and for all the varying tilts of the wheels. Consequently the axis of rotation of all the mechanism operated around the vertical axis is always in right angled intersection with the axis of rotation of all the mechanism operated around the horizontal axis of rotation.

For steering or turning the machine or vehicle the tubular member 25 which is the king pin of the invention being described is rotated within the tubular member 24 (Fig. 5). For turning the machine around (Fig. 7) the upper control gears 34 and 37 remain in a fixed position with reference to the machine or vehicle body and therefore the worms 31 and 33 remain stationary. As the front axle is turned on its vertical axis the rotating of the worms 45 and 50 around the worm gears 31 and 33 respectively will cause a very slight rotation of these worm gears and consequently a very slight rotation of the arm 56 and a very slight rotation of the spur gear 49. Since these gears both turn in the same direction, the tendency of the arm 56 to tilt the wheels in one way will be offset by the movement of the shaft 20 in the opposite direction and the one will neutralize the other.

In steering or turning the machine the wheels will remain vertical or at whatever angle they happen to be at the time the turning movement begins.

In turning the machine or vehicle the tongue 61 would be rotated through more than a right angle or to such a position as 61a as shown in Fig. 7. The tongue 61 is attached to the front axle in such a way that any side movement of the tongue 61 will produce a corresponding turning movement in the axle, around the vertical axis of the assembly Y, and consequently with reference to the body of the machine or vehicle. This attachment of the tongue 61 shown in Figs. 2 and 7 is so made as to give a certain vertical movement of the tongue 61 in order to properly attach the tongue to the pulling means. This is accomplished as shown in Fig. 2 by extending the cross tie plates 6 a sufficient distance forward to clear the channel 23 and attaching the tongue to a cross member 62 arranged with proper braces 63 as shown. The cross member 62 is in two pieces and is joined by a link 64 which is shown in section in Fig. 2a. The forward ends of the braces are joined by a link piece 65 which is shown in section in Fig. 2b. The tongue 61 is pivoted on the pin 66 as shown in Fig. 2 and 2b, and its rear end extends into the link 64, the tongue fitting into members 64 and 65 so that there will be no side movement. By this means a side pull on the tongue 61 will correspondingly turn the axle and at the same time, the tongue will have a certain vertical movement for making attachment to the power.

The particular method by which this attachment is made is immaterial. Any method which holds the steering means in rigid relation to the axle in its movement about a vertical axis is within the scope of this invention. This tongue 61 is a steering tongue.

In road machine practice there is usually also a pulling tongue attached to the steering tongue by which the pulling of the machine is done in a different line of direction from the steering tongue. In the method of steering just described the pulling tongue is not shown as it has no part in this invention and is a device which can be attached to the steering tongue 61 shown.

The front axle described herein can be turned completely around a vertical axis, it can tilt on a horizontal axis to follow the irregularities of the ground, the wheels can be tilted sidewise to brace against the side pull of the load and the supporting point for the body frame can be shifted sidewise to give the desired downward pressure on either wheel as desired. Each of these movements can be operated separately, or any two or three of them, or all together, without affecting the transverse level of the bed frame of the machine.

Figure 12A:
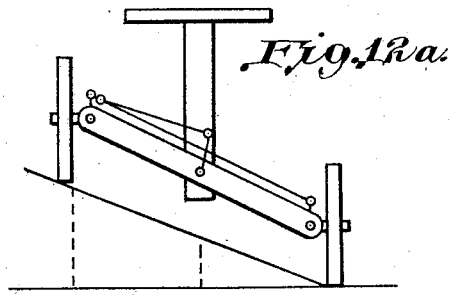
Fig. 12a, shows an outline with the axle inclined, the wheels vertical and the point of support of the body frame midway between the wheels.
Figure 13:
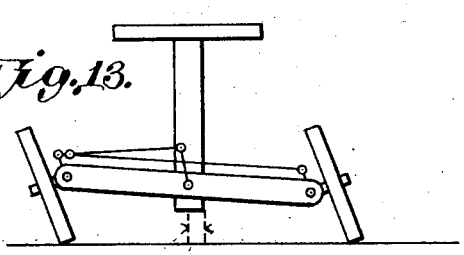
Fig. 13, shows an outline with the wheels tilted, the point of support of the body frame midway between the wheels and the axle approximately horizontal.
Figure 13A:
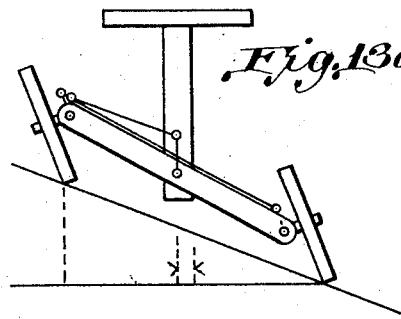
Fig. 13a, shows an outline with the axle inclined, the wheels tilted and the point of support of the body frame midway between the wheels.
Figure 14:
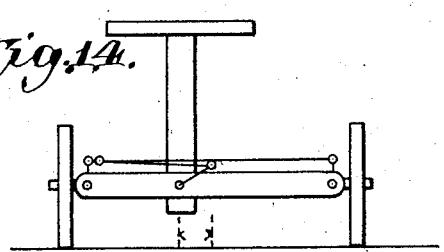
Fig. 14, shows an outline with the axle horizontal, the wheels vertical and the point of support of the body frame shifted toward the left hand wheel.
Figure 14A:
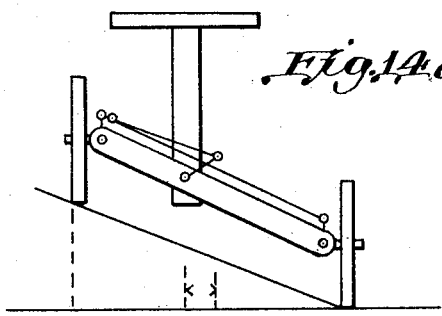
Fig. 14a, shows an outline with the wheels vertical, the axle inclined and the point of support of the body frame shifted toward the left hand wheel.
Figure 15:
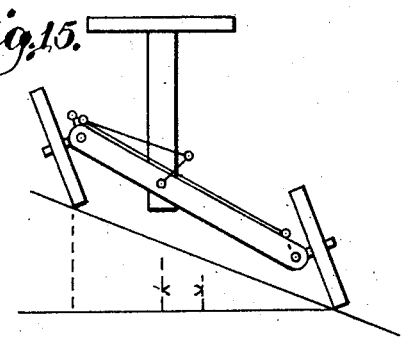
Fig. 15, shows an outline with the wheels tilted, the axle inclined and the point of support of the body frame shifted toward the left hand wheel.

The position of the axle in Fig 12 is normal with the wheels vertical, the axle horizontal and the machine body support in mid position. The position of the axle in Fig. 12a is obtained from Fig. 12 without the use of any controls, the surface of the ground determines the tilt of the axle. Fig. 13 is obtained from Fig. 12 by operating the control 39. The position of the axle in Fig. 13a is obtained from Fig. 12 by operating control 39; the surface of the ground determines the tilt of the axle. Fig. 14 is obtained from Fig. 12 by operating the control 36 to shift the point of support sidewise and at the same time by operating control 39 to correct the tilt of the wheels. The position of the axle in Fig. 14a is obtained from Fig. 12 by operating both controls, 36 and 39 the same as in Fig. 14; the surface of the ground determines the tilt of the axle. Fig. 15 is obtained from Fig. 12 by operating both controls, 36 and 39, but control 39 is not operated to as great an extent relative to 36 as in the case of Fig. 14a; the surface of the ground determines the tilt of the axle.

Figure 15A:
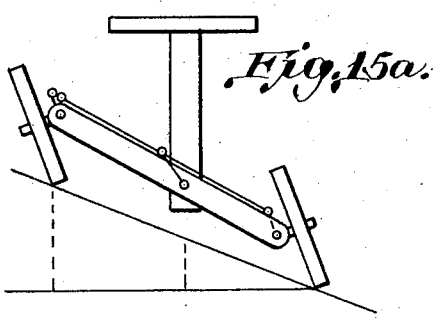
Fig. 15a, shows an outline with the wheels tilted, the axle inclined and the point of support of the body frame shifted in the direction of the right hand wheel so that this point is directly above the mid position between the points projected where the wheels are in contact with the ground.

The position of the axle in Fig. 15a is obtained from Fig. 12 by operating both controls, 36 and 39, but control 39 is operated to a greater extent relative to 36 than in the case of Fig. 14a; the surface of the ground determines the tilt of the axle.

In Fig. 15 the center of gravity is moved up hill the amount of the distance shown between the arrows and the downward pressure on the left hand wheel is almost twice the downward pressure on the right hand wheel. In Fig. 15a the point of support has been shifted down hill from what it is in Fig. 15 to a point where the downward pressure on the two wheels is equal.

The Figures 12 to 15a inclusive are typical and show the high side of the axle on the left and the top of the wheels tilting to the left. With the mechanism described herein, these positions can just as easily be reversed and the axle be operated with the high side of the axle on the right side and the wheels tilted so that their tops will be to the right. Figs. 14, 14a and 15 show the box Z moved to the left so that the center of gravity is moved toward the left hand wheels by the amount shown between the dotted lines. With the axle and wheels still tilted as shown in these figures, the box Z can be shifted along the axle to put the center of gravity midway between the contact points of the wheels on the ground, as illustrated in Fig. 15a, or even if necessary to move the box Z to a point where the center of gravity is nearer the right hand wheel. With the high side on the right hand side and the top of the wheels tilted to the right, the box Z can be moved as far to the right as it is moved to the left in the figures, and the position of the center of gravity on the axle controlled in the same manner and to the same extent, as illustrated for the opposite condition in Figs. 14, 14a, 15 and 15a.

Each of the controls 36 and 39, can be operated separately or both together as may be required, the wheels cause the axle to follow the surface of the ground without the use of controls, the steering and turning is done by a tongue in the same way as with an ordinary wagon and withal the bed frame of the machine or vehicle body is always approximately transversely horizontal being held in this position by mechanism, not shown, carried by the rear axle.

Having thus described my invention, what I claim as new and desire to secure by Letters Patent, is—

1. In a road grading machine in the operation of which the bed can be maintained approximately level transversely regardless of the transverse grade of the ground, the combination with the bed, of an axle movable freely about a horizontal axis and also rotatable freely about a vertical axis, and wheels on the axle, of means for tilting the wheels sidewise of the machine, means for supporting the bed from the axle and means for moving the supports of the bed of the machine lengthwise of the axle, said wheel tilting means and lengthwise moving means being capable of operating separately or simultaneously.

2. In a road grading machine, the combination with the bed of an axle movable freely about a horizontal axis and also rotatable freely about an approximately vertical axis, and wheels on the axle, of means for tilting the wheels sidewise of the machine, means for supporting the bed from the axle and means for moving the supports of the bed of the machine lengthwise of the axle, said wheel tilting means and lengthwise moving means being capable of operating separately or simultaneiusly from a remote point located near the rear of the machine.

3. In a road grading machine in the operation of which the bed can be maintained approximately level regardless of the transverse grade of the ground, the combination with the bed, of an axle movable freely about a horizontal axis to allow the axle to follow the surface of the ground and also rotatable freely about a vertical axis to steer the machine, and wheels on the axle, of means for tilting the wheels sidewise of the machine operated by a shaft whose axis is concentric with said vertical axis, means for supporting the bed from the axle and means for moving the supports of the bed of the machine lengthwise of the axle, operated by a shaft whose axis is likewise concentric with said vertical axis, said vertical and horizontal axes always being in intersection with, and at right angles to, each other.

4. In a road grading machine in the operation of which the bed can be maintained approximately level transversely regardless of the transverse grade of the ground, the combination with the bed, of an axle movable freely about a horizontal axis and also rotatable freely about a vertical axis, and wheels on the axle, of means for tilting the wheels sidewise of the machine, means for supporting the bed from the axle and means for moving the supports of the bed of the machine lengthwise of the axle, and a king pin, said wheel tilting means and lengthwise moving means being operable by connections having their axes concentric with, and extending through, the king pin of the machine.

5. In a road grading machine, the combination with the bed, of an axle movable freely about a horizontal axis and also rotatable freely about an approximately vertical axis, and wheels on the axle, of means for tilting the wheels sidewise of the machine, means for supporting the bed from the axle and means for moving the supports of the bed of the machine lengthwise of the axle, and a king pin, said wheel tilting means and lengthwise moving means being operable by connections having their axes concentric with, and extending through, the king pin of the machine, the movement of said connections being controlled from a remote point located near the rear of the machine.

6. In a road grading machine in the operation of which the bed can be maintained approximately level transversely regardless of the transverse grade of the ground, the combination with the bed, of an axle movable freely about a horizontal axis and also rotatable freely about a vertical axis, and wheels on the axle, of means for tilting the wheels sidewise of the machine, means for supporting the bed from the axle and means for moving the supports of the bed of the machine lengthwise of the axle, a king pin, said wheel tilting means and lenthwise moving means being operable by connections having their axes concentric with, and extending through, the king pin of the machine, the connection for one of said wheel tilting and lengthwise moving means being tubular and having the said other means rotating within it.

7. In a road grading machine in the operation of which the bed can be maintained approximately level transversely regardless of the transverse grade of the ground, the combination with the bed, of an axle movable freely about a horizontal axis and also rotatable freely about a vertical axis, and wheels on the axle, of means for tilting the wheels sidewise of the machine, means for supporting the bed from the axle and means for moving the supports of the bed of the machine lengthwise of the axle, a king pin, means comprising gearing for operating the wheel tilting means, means comprising gearing for operating the lengthwise moving means whereby the tilt of the wheels due to the rotation of the wheel tilting mechanism on the horizontal axis when the axle is rotated on its vertical axis is compensated for, by a corresponding movement in the opposite direction lengthwise of the axle, of the support for the wheel tilting mechanism, to maintain the wheels at a fixed angle with the horizontal when steering or turning the machine.

8. In a road grading machine in the operation of which the bed can be maintained approximately level transversely regardless of the transverse grade of the ground, the combination with the bed, of an axle movable freely about a horizontal axis and also rotatable freely about a vertical axis, of a king pin, means for moving the support of the bed of the machine lengthwise of the axle, said means being operable by a connection having its axis concentric with, and extending through, the king pin of the machine, said connection being operable from a remote point located near the rear of the machine.

9. In a road grading machine in the operation of which the bed can be maintained approximately level transversely regardless of the transverse grade of the ground, wheels and axles for the support of the bed, means for supporting the bed from the front axle, said axle being movable freely about a horizontal axis, and also rotatable freely about a vertical axis, means for tilting the wheels sidewise of the machine and means for moving the supports of the bed of the machine lengthwise of the axle, the wheel tilting means being operable at the same time the axle is moved about either the horizontal or the vertical axis, or when the axle is moved about both the horizontal and the vertical axes simultaneously; the lengthwise moving means being operable at the same time the axle is moved about either the horizontal or the vertical axis, or when the axle is moved about both the horizontal and the vertical axes simultaneously; and both the wheel tilting means and the lengthwise moving means being operable simultaneously in conjunction with the movement of the axle about either the horizontal or the vertical axis or when the axle is moved about both the horizontal and the vertical axes simultaneously.

10. The combination with a road grading machine having a bed, of an axle consisting of two spaced apart members moving as a unit freely about a horizontal axis, a box slidable lengthwise of the axle between the two spaced apart members, said box carrying a horizontal shaft which supports the bed of the machine, said shaft being carried by the box at right angles to the direction of motion of said box and slots in the sides of the two axle members so that the box with its shaft may slide lengthwise of the axle, wheels on the axle, a hollow king pin, means comprising a spur gear rotatably carried by said horizontal shaft for moving the box lengthwise of the axle, means comprising a spur gear rotatably carried by said horizontal shaft for tilting the wheels on said axle, a block mounted rotatably on said horizontal shaft between said two spur gears for spacing said gears apart, a vertical shaft rotatively moving within said king pin, the lower end of said vertical shaft having a bearing in the top of said block and rotatively operating in said bearing.

11. The combination with a road grading machine having a bed, of an axle consisting of two spaced apart members movable freely about a horizontal axis, a box slidable lengthwise of the axle between the two spaced apart members, said box carrying a horizontal shaft which supports the bed of the machine, said shaft being considerably longer than the extreme width of the axle and being carried by the box at right angles to the direction of motion of said box and slots in the sides of the two axle members so that the box with its shaft may slide lengthwise of the axle.

12. The combination with a road grading machine having a bed, of an axle consisting of two spaced apart members movable freely about a horizontal axis, a box slidable lengthwise of the axle between the two spaced apart members, said box carrying a horizontal shaft which supports the bed of the machine said shaft being considerably longer than the extreme width of the axle and being carried by the box at right angles to the direction of motion of said box and slots in the sides of the two axle members so that the box with its shaft may slide lengthwise of the axle, and means for rotatively securing both ends of said shaft to each of the two ends of said box so that the shaft and the box will be held in rigid relation to each other.

In testimony whereof I affix my signature.

WILLIAM M. TAYLOR.